US012698029B2

(12) United States Patent
Strecker

(10) Patent No.: US 12,698,029 B2
(45) Date of Patent: Aug. 4, 2026

(54) METHOD FOR OPERATING A STEERING SYSTEM OF A VEHICLE

(71) Applicant: Robert Bosch GmbH, Stuttgart (DE)

(72) Inventor: Joerg Strecker, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/842,173

(22) PCT Filed: Feb. 8, 2023

(86) PCT No.: PCT/EP2023/053045
§ 371 (c)(1),
(2) Date: Aug. 28, 2024

(87) PCT Pub. No.: WO2023/174617
PCT Pub. Date: Sep. 21, 2023

(65) Prior Publication Data
US 2025/0187653 A1    Jun. 12, 2025

(30) Foreign Application Priority Data
Mar. 14, 2022    (DE) ..................... 10 2022 202 483.4

(51) Int. Cl.
B62D 5/04        (2006.01)
B62D 5/00        (2006.01)
B62D 6/00        (2006.01)
(52) U.S. Cl.
CPC ........... B62D 5/0484 (2013.01); B62D 5/003 (2013.01); B62D 6/002 (2013.01); B62D 5/006 (2013.01)
(58) Field of Classification Search
CPC ...... B62D 5/0484; B62D 5/003; B62D 6/002; B62D 5/006
See application file for complete search history.

(56) References Cited

U.S. PATENT DOCUMENTS

2011/0036660 A1* 2/2011 Kojo ..................... B62D 6/002
                                                      180/446
2021/0371007 A1* 12/2021 Collier-Hallman .... B62D 6/002
(Continued)

FOREIGN PATENT DOCUMENTS

DE        101 01 827 A1    7/2002
DE        103 02 268 A1    7/2004
(Continued)

OTHER PUBLICATIONS

International Search Report corresponding to PCT Application No. PCT/EP2023/053045, mailed May 11, 2023. (German and English language document). (5 pages).

*Primary Examiner* — Sizo B Vilakazi
(74) *Attorney, Agent, or Firm* — Maginot, Moore & Beck LLP

(57)        ABSTRACT

The disclosure relates to a method for operating a steering system of a vehicle, in particular a motor vehicle. The steering system is designed as a steer-by-wire steering system and includes an operating unit, which has at least one steering handle and at least one feedback actuator that interacts with the steering handle, and at least one wheel steering angle control element, which is operatively connected to the operating unit, for changing the steering angle of at least one vehicle wheel. An operation of the feedback actuator is monitored using a monitoring function, and in at least one operating state in which a disturbance and/or a failure of the feedback actuator is ascertained using the monitoring function, a steering characteristic of the steering system is modified. A steering ratio between the operating unit and the wheel steering angle control element is modified in order to change the steering characteristic.

17 Claims, 2 Drawing Sheets

(56)  References Cited

U.S. PATENT DOCUMENTS

2022/0176930 A1\*  6/2022  Kim ...................... B60T 11/165
2023/0017618 A1\*  1/2023  Albrecht ................ B62D 6/008
2023/0068424 A1\*  3/2023  Sun ...................... B62D 5/0469

FOREIGN PATENT DOCUMENTS

DE  10 2016 005 938 A1   11/2017
DE  10 2016 009 684 A1    2/2018
DE  10 2018 222 442 A1    6/2020
DE     102019135047 A1 *  6/2021   ............ B62D 5/006

\* cited by examiner

METHOD FOR OPERATING A STEERING SYSTEM OF A VEHICLE

This application is a 35 U.S.C. § 371 National Stage Application of PCT/EP2023/053045, filed on Feb. 8, 2023 which claims the benefit of priority to Serial No. DE 10 2022 202 483.4, filed on Mar. 14, 2022 in Germany, the disclosure of which is incorporated herein by reference in its entirety.

BACKGROUND

The disclosure is based upon a method for operating a steering system of a vehicle. In addition, the disclosure relates to a computing unit for performing such a method, a steering system with such a computing unit and a vehicle with such a steering system.

Vehicles with conventional steering systems are known from the prior art, in which a steering handle, for example in the form of a steering wheel, is mechanically connected to a wheel steering angle control element in the form of a steering gear via a steering column. Also known are vehicles comprising steer-by-wire steering systems which do not require a direct mechanical connection between a steering handle and the steered vehicle wheels and in which a driver target specification and/or steering specification is only transmitted electrically. A steer-by-wire steering system of this type usually comprises an operating unit with a steering handle and a feedback actuator as well as at least one wheel steering angle control element that is mechanically separate from the operating unit and can, e.g., be designed as a central regulator or as a single-wheel controller.

Furthermore, such steer-by-wire steering systems are always designed redundantly for reasons of operational safety. With regard to the operating unit, one option is to design the operating unit to be fail-safe or fail-operational. In addition, the operating unit can also be designed to be fail-operational with regard to detecting a driver target specification and fail-safe with regard to a feedback torque provided by the feedback actuator. With a corresponding design of the operating unit, a malfunction and/or failure of the feedback actuator due to the sudden loss of the feedback torque can lead to unintentional steering movements at the steering handle, which are interpreted by the steering system as a driver target specification and/or steering specification and can consequently lead to an undesired reaction of the vehicle. Possible methods for handling such errors can, e.g., be found in DE 10 2016 009 684 A1 and DE 10 2018 222 442 A1.

Therefore, the object of the disclosure is in particular to provide a method having improved properties with regard to a mode of operation. This object is achieved by the features described herein.

SUMMARY

The disclosure relates to a method for operating a steering system of a vehicle, in particular a motor vehicle. The steering system is designed as a steer-by-wire steering system and comprises an operating unit, which comprises at least one steering handle and at least one feedback actuator that interacts with the steering handle, and at least one wheel steering angle control element, which is operatively connected to the operating unit, for changing the steering angle of at least one vehicle wheel, whereby an operation of the feedback actuator is monitored using a monitoring function, and in at least one operating state in which a disturbance and/or a failure of the feedback actuator is ascertained using the monitoring function, a steering characteristic of the steering system is modified.

It is proposed that a steering ratio between the operating unit and the wheel steering angle control element is modified in order to change the steering characteristic. The operating state in which a disturbance and/or a failure of the feedback actuator is ascertained using the monitoring function therefore corresponds in particular to a fault operating state. Furthermore, the steering characteristic is in particular changed by modifying the steering ratio such that, in the operating state and in particular in the case of a transition of the feedback actuator from an active and/or fully operable state to a passive and/or degraded state, a substantially consistent steering behavior is provided and/or achieved and an unintended steering movement of a driver due to a disturbance and/or failure of the feedback actuator does not result in an undesirable vehicle response. In particular, this design can improve functionality, whereby the controllability and/or manageability of the vehicle can be advantageously improved in the event of a fault or if the active feedback torque of the feedback actuator is omitted. In addition, an advantageously adaptive and/or variable method can be provided in which the steering characteristics can be flexibly adapted to current operating conditions. In addition, advantageous maneuverability of the vehicle can be achieved and operational safety increased.

In the present case, the steering system is designed as a steer-by-wire steering system, in which a driver target specification and/or steering specification, in particular from a driver, is advantageously transmitted to the vehicle wheels purely electrically. For this purpose, the steer-by-wire steering system comprises the, in particular redundantly designed, operating unit and at least one wheel steering angle control element that is mechanically separate from the operating unit and, in particular, redundantly designed. Preferably, the operating unit and the wheel steering angle control element are designed to be at least partially fail-operational. The term "wheel steering angle control element" is to be understood as an actuator unit coupled to at least one vehicle wheel, which is intended to transmit a driver target specification and/or steering specification, in particular of a driver, to the vehicle wheel by changing a wheel steering angle of at least one vehicle wheel and thereby advantageously control at least one alignment of the vehicle wheel and/or influence a direction of travel of the vehicle. To this end, the wheel steering angle control element advantageously comprises at least one steering regulator element, for example in the form of a gear rack, and at least one steering actuator, for example in the form of an electric motor, which is operatively connected to the steering regulator element. The wheel steering angle control element can be designed as a central regulator and be assigned to at least two vehicle wheels, in particular steerable and preferably designed as front wheels. Alternatively, however, the wheel steering angle control element can also be designed as a single-wheel controller and assigned to exactly one vehicle wheel, in particular a steerable wheel, preferably designed as a front wheel. Furthermore, the term "feedback actuator" is understood to mean an actuator unit, in particular different from the wheel steering angle control element and in particular directly mechanically connected to the steering handle, which is intended to detect signals, forces and/or torques from the steering handle, in particular directly, and/or to transmit them to the steering handle, in particular directly. In the present case, the feedback actuator is provided in a normal operating state at least to provide an active feedback torque and thereby to generate a steering resistance and/or a restoring torque on the steering handle. Furthermore, the feedback actuator is intended in this context to adjust a steering feel that can be perceived in particular via the steering handle. For this purpose, the feedback actuator can comprise at least one further electric motor. In particular, the expression "a disturbance and/or failure of the feedback actuator" is understood to mean a disturbance and/or failure of the feedback actuator itself and/or of a peripheral module that interacts with the feedback actuator, such as a power supply, and a disturbance of the feedback actuator caused thereby. Furthermore, the wheel steering angle is basically equivalent to other variables between the steering actuator and the vehicle wheel, such as a deflection of the steering regulator element and/or a deflection position of the wheel steering angle control element and/or a motor movement. The same applies to a deflection of the steering handle, which is equivalent to other variables between the steering handle and the feedback actuator, such as a steering column angle and/or a motor angle. For the torque values on the vehicle wheel and on the steering handle, the same equivalence of variables applies between the vehicle wheel/steering handle and the respective connected actuator.

Furthermore, the vehicle and preferably the steering system comprise at least one computing unit, which is intended to perform the method for operating the steering system. The term "computing unit" is understood to mean an electrical and/or electronic unit having an information input, information processing, and an information output. Advantageously, the computing unit also has at least one processor, at least one operating memory, at least one input means and/or output means, at least one operating program, at least one control routine and/or regulation routine, at least one calculation routine, at least one determination routine, at least one evaluation routine and/or at least one adaptation routine. In particular, the computing unit in the present case comprises at least one monitoring function for monitoring an operation of the feedback actuator. Furthermore, the computing unit is intended in particular to monitor and evaluate an operation of the feedback actuator by means of the monitoring function. In addition, the computing unit is provided to change a steering characteristic of the steering system in at least one operating state in which a disturbance and/or a failure of the feedback actuator is ascertained using the monitoring function, and to modify a steering ratio between the operating unit and the wheel steering angle control element for this purpose. In this context, the computing unit can be provided in particular to use an error signal provided by the monitoring function to adjust the steering characteristics. Preferably, the computing unit is in this case preferably integrated into a control device of the vehicle, e.g., a central vehicle control device, or preferably a control device of the steering system, in particular in the form of a steering control device. The term "steering ratio" is understood to mean a, in particular virtual, gear ratio between the operating unit and the wheel steering angle control element, which defines a correlation between a driver target specification and/or a steering specification on the steering handle and a wheel steering angle of the vehicle wheel and/or the vehicle wheels. The steering ratio therefore at least indicates how a deflection of the steering handle or a steering angle of the steering handle affects a deflection of the vehicle wheel and/or the vehicle wheels or a steering angle of the vehicle wheel and/or the vehicle wheels. In the present case, this results in a target specification for the wheel steering angle control element based on the driver target specification and/or the steering specification on the steering handle and the steering ratio, whereby the wheel steering angle control element is provided to implement the target specification. The term "provided" is understood in particular as meaning specifically programmed, designed and/or equipped. In particular, the phrase "an object being provided for a specific function" is intended to mean that the object fulfills and/or performs this specific function in at least one application-and/or operating state.

It is further proposed that a current driving situation and/or an imminent driving situation is considered when changing the steering characteristic and, in particular, when modifying the steering ratio, which in particular allows the steering characteristic to be changed to adapt to the situation. In this case, the steering characteristic is in particular changed as a function of the current driving situation and/or the imminent driving situation. The current travel situation and/or the imminent travel situation can, e.g., be ascertained and/or forecasted based on at least one vehicle variable, for example, a yaw rate, a deflection of the steering handle, and/or a steering movement. Alternatively or additionally, however, the current travel situation and/or the imminent driving situation can also be derived from a route planning of a navigation system of the vehicle and/or a corresponding sensor system, for example in the form of a camera system, of the vehicle.

The operating state corresponds advantageously to cornering. Preferably, the steering characteristic is only changed if the wheel steering angle of the vehicle wheel is not equal to zero and is advantageously at least 0.1°, in particular in terms of magnitude. It is particularly preferable for the steering characteristic to be changed when the vehicle is cornering, while no change in the steering characteristic is made when the vehicle is traveling in a straight line. This can in particular increase an operational reliability in critical driving situations. In addition, a particularly efficient procedure can be advantageously provided.

Furthermore, it is proposed that a dynamic and/or an absolute value of the driver target specification for the wheel steering angle control element, for example a maximum deflection of the steering handle and/or a steering speed of the steering handle, is considered when changing the steering characteristic and, in particular, when modifying the steering ratio. The dynamic and/or the absolute value of the driver target specification can, e.g., be ascertained using a further monitoring function, in particular the computing unit. It is also conceivable to change the steering characteristic by modifying the steering ratio only when the dynamic and/or absolute value of the driver target specification exceeds a limit value. In particular, an overreaction of the driver when the active feedback torque of the feedback actuator is removed can be ascertained and the steering characteristic can be adjusted as a function thereof.

It is further proposed that the steering ratio is increased in the operating state to change the steering characteristic. Preferably, the steering ratio is increased from a normal or current steering ratio in particular used in an error-free normal operating state, to a modified steering ratio, whereby the modified steering ratio is at least 10%, preferably at least 20%, and particularly preferably at least 30% greater than the normal steering ratio. This reduces the vehicle response and the situation becomes more manageable for the driver.

According to a particularly preferred embodiment, it is proposed that in the operating state and in particular to change the steering characteristic, a change is made from the normal or current steering ratio to the modified steering ratio by means of a cross-fade and in particular using a moving average. For this purpose, a fade factor is defined which initially has the value 0 and at the end of the cross-fading or the fade phase has the value 1. An actual steering ratio is then obtained during the cross-fade or fade phase by superimposing the normal or current steering ratio and the modified steering ratio and taking the fade factor into account. This enables a particularly harmonious transition from the normal or current steering ratio to the modified steering ratio.

The normal or current steering ratio and/or the modified steering ratio can be selected, for example, as a function of a vehicle speed and/or a deflection of the steering handle and/or a deflection of the steering control element, for example, in the form of a rack and pinion stroke, and/or a wheel steering angle of the at least one vehicle wheel. Advantageously, however, it is proposed that the modified steering ratio has a fixed value. As a result, a defined and pre-applied vehicle response can be advantageously defined in the operating state. In addition, computing resources required can be minimized.

It is preferably further proposed that a steering speed of the steering handle is considered when changing the steering characteristic and, in particular when modifying the steering ratio, and that a duration of the cross-fade is varied as a function of the steering speed. Advantageously in this case, at least the fade factor is a dynamic value that can be influenced by means of the steering speed. In addition, the steering speed can be offset by a further factor, which can be constant or dependent on the vehicle speed or other vehicle sizes, for example. As a result of this design, it is advantageously possible to switch more or less quickly from the normal or current steering ratio to the modified steering ratio, depending on steering dynamics.

A particularly simple implementation of cross-fading can in particular be achieved by means of software if an integrator is used for cross-fading. In particular, the computing unit can comprise the integrator. Preferably, the integrator can be activated in the operating state by an error signal provided by the monitoring function and/or enabled by an enable signal. Preferably, the integrator is only activated in this context if a disturbance and/or a failure of the feedback actuator is ascertained using the monitoring function. The integrator is therefore preferably deactivated in the normal operating state, which can advantageously reduce resource requirements. In addition, the integrator can initially be disabled after activation so that an additional enabling must be provided by the enable signal.

Preferably, the enable signal is only generated when the normal or current steering ratio is less than the modified steering ratio and/or a sign of a deflection of the steering handle and a sign of the steering speed of the steering handle coincide with each other. In this context, the integrator is therefore released only under the condition that the normal or current steering ratio is less than the modified steering ratio and/or under the condition that the driver actually increases their driver target specification or steering specification and therefore steers further into the bend when cornering. This can in particular further increase operational reliability.

In addition, it is proposed that a modified absolute value of the steering speed is used as the input variable of the integrator, whereby a dead zone is used to modify the steering speed. The dead zone in particular ensures that a reaction only occurs when the driver initiates clear steering movements or the steering speed reaches a corresponding threshold value. As a result, an overreaction by the driver can be compensated for in an advantageous manner when the active feedback torque of the feedback actuator is removed.

In a further embodiment, it is also proposed that a vehicle speed is considered when changing the steering characteristic and, in particular, when modifying the steering ratio. Preferably, the vehicle speed is ascertained and evaluated at least to ascertain the normal or current steering ratio and/or the modified steering ratio. Advantageously, the normal or current steering ratio and/or the modified steering ratio is therefore dependent on the vehicle speed. The steering characteristic can thereby be particularly flexibly adjusted to current operating conditions.

The method for operating the steering system is not intended to be limited to the application and embodiment described hereinabove. In particular, the method for operating the steering system in order to achieve the functioning described herein can comprise a number of individual elements, components, and units that differs from the number specified herein.

BRIEF DESCRIPTION OF THE DRAWINGS

Further advantages follow from the description of the drawings hereinafter. An exemplary embodiment of the disclosure is shown in the drawings.

Shown are.

DETAILED DESCRIPTION

Figure 1A:
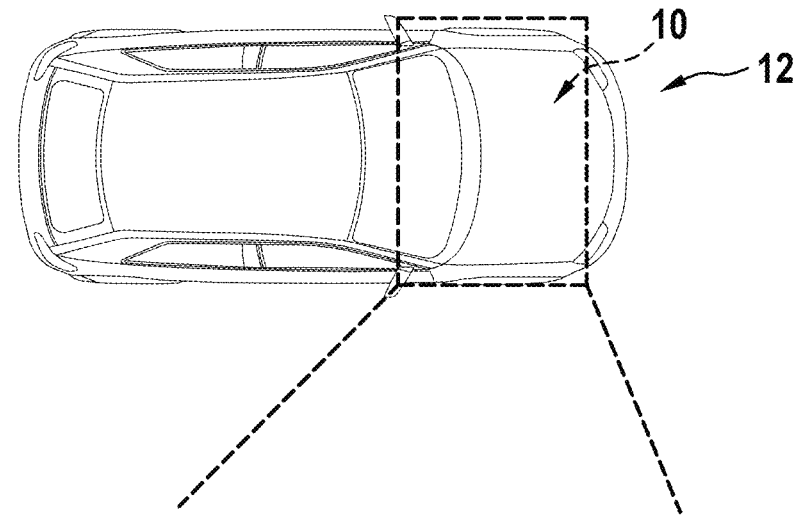
FIGS. 1a-b a vehicle with a steering system designed as a steer-by-wire steering system in a simplified representation, FIG. 2 exemplary diagrams of various signals for operating the steering system, and FIG. 3 an exemplary flow chart comprising the main method steps of a method for operating the steering system.
Figure 1B:
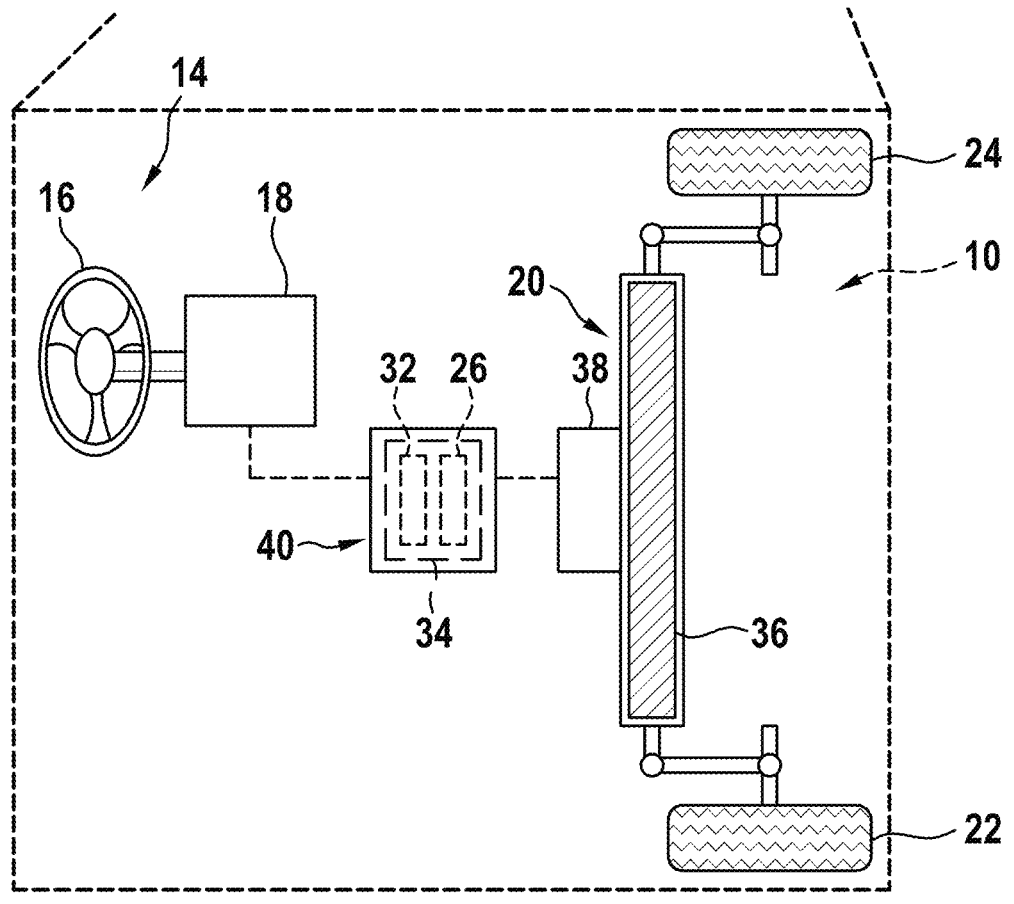

FIGS. 1a and 1b show a simplified illustration of a vehicle 12 which is, e.g., designed as a passenger vehicle comprising a plurality of vehicle wheels 22, 24 and a steering system 10. The steering system 10 is operatively connected to the vehicle wheels 22, 24, and is provided to influence a direction of travel of the vehicle 12. Furthermore, the steering system 10 is designed as a steer-by-wire steering system in the present case, in which a driver target specification or steering specification is transmitted electrically to the vehicle wheels 22, 24 in at least one operating state.

The steering system 10 comprises an operating unit 14, in particular actuatable by a driver and/or an occupant. The operating unit 14 comprises a steering handle 16 in the form of, e.g., a steering wheel, and a feedback actuator 18 which is in particular mechanically coupled to the steering handle 16. In the present case, the feedback actuator 18 is provided in a normal operating state at least to provide an active feedback torque and thereby to generate a steering resistance and/or a restoring torque on the steering handle 16. To this end, the feedback actuator 18 comprises at least one electric motor (not shown) designed in particular as a permanently excited synchronous motor. Furthermore, the operating unit 14 is designed to be fail-operational with regard to detecting the driver target specification, in particular via the steering handle 16, and fail-safe with regard to a feedback torque provided by the feedback actuator 18. A steering handle could alternatively also be designed as a joystick, a steering lever, and/or as a steering ball or the like. A feedback actuator could further comprise a plurality of electric motors. In addition, an operating unit could in principle also be fail-safe or fail-operational.

The steering system 10 further comprises a known wheel steering angle control element 20. The wheel steering angle control element 20 is mechanically separate from the operating unit 14. The wheel steering angle control element 20 is purely electrically connected to the operating unit 14. Further, the wheel steering angle control element 20 is, e.g., designed as a central regulator. The wheel steering angle control element 20 is operatively connected to at least two of the vehicle wheels 22, 24, in particular two front wheels, and is intended to convert the driver target specification or steering specification into a steering movement of the vehicle wheels 22, 24. For this purpose, the wheel steering angle control element 20 comprises a steering regulator element 36 designed (by way of example) as a gear rack, and a steering actuator 38 that interacts with the steering regulator element 36. In the present case, the steering actuator 38 comprises at least one further electric motor (not shown), designed in particular as a permanently excited synchronous motor, and is provided for controlling the steerable vehicle wheels 22, 24. A steering system could in principle basically also comprise a plurality of wheel steering angle control element, in particular designed as single-wheel controllers. Furthermore, a steering actuator could comprise a plurality of electric motors.

The vehicle 12 further comprises a control device 40. In the present case, the control device is designed as a steering control device and is therefore part of the steering system 10. The control device 40 comprises an electrical connection to the wheel steering angle control element 20. The control device 40 also comprises an electrical connection to the operating unit 14. The control device 40 is provided at least for controlling an operation of the steering system 10. In the present case, the control device 40 is intended to control the steering actuator 38 as a function of a signal from the operating unit 14 as, e.g., a function of the driver target specification or steering specification and/or a manual torque. The control device 40 can further be provided to actuate the feedback actuator 18 depending on a signal from the wheel steering angle control element 20.

The control device 40 comprises a computing unit 34 for this purpose. The computing unit 34 comprises at least one processor (not depicted), e.g. in the form of a microprocessor, and at least one operating memory (not depicted). The computing unit 34 also comprises at least one operating program stored in the operating memory and has at least one calculation routine, at least one determination routine, at least one evaluation routine, and at least one adaptation routine. In addition, the computing unit 34 in the present case comprises at least one monitoring function 26. A control device could in principle also be different from a steering control device and designed, e.g., as a single, central vehicle control device having a central computing unit. It is also conceivable to provide separate control devices and/or computing units for one wheel steering angle control element as well as one operating unit and communicatively interconnect them.

The vehicle 12 and/or the steering system 10 can also comprise further components and/or assemblies (not shown), such as an internal vehicle sensor system for detecting at least one vehicle variable, for example a yaw rate, an external sensor system, for example in the form of a camera system, and/or an inherently known navigation system.

In the event of a malfunction and/or failure of the feedback actuator 18, under certain circumstances and/or in certain driving situations, such as when cornering, the sudden loss of the feedback torque when the feedback actuator 18 transitions from an active and/or functional state to a passive and/or degraded state can lead to unintended steering movements at the steering handle 16, which are interpreted by the steering system 10 as a driver target specification and/or steering specification and can consequently lead to an undesired vehicle reaction. In this context, it is assumed that the passive behavior of the feedback actuator 18 with regard to torque feedback is sufficient to operate the vehicle 12 safely, and only the transition from the active to the passive case can present difficulties with regard to controllability. This difficulty is caused by the feedback torque decreasing abruptly in the event of a corresponding malfunction and/or failure of the feedback actuator 18 because the inherent passive friction in the steering system 10 is significantly lower than the feedback torque in the normal operating state. Particularly when cornering, a sudden reduction in the feedback torque, and consequently a counter-torque on the steering handle 16, can lead to safety-critical situations because the driver can only readjust their holding force after a delay due to their reaction time, so the driver steers further into the bend than intended. Depending on the steering ratio, a more indirect ratio can increase controllability even after the transition to the passive state.

To avoid such safety-critical situations, a method for operating the steering system 10 is therefore proposed hereinafter. In the present case, the computing unit 34 is provided to perform the method and comprises for this purpose a computer program having corresponding program code means. Alternatively, however, a computing unit of a control device, associated with an operating unit, could also be intended for performing the method.

According to the disclosure, an operation of the feedback actuator 18 is monitored using the monitoring function 26 and, in at least one operating state in which a disturbance and/or failure of the feedback actuator 18 is ascertained using the monitoring function 26, a steering characteristic of the steering system 10 is changed by modifying a, in particular virtual, steering ratio between the operating unit 14 and the wheel steering angle control element 20. In the present case, the steering characteristic is changed by modifying the steering ratio in such a way, that in the operating state, and in particular in the case of a transition of the feedback actuator 18 from an active and/or fully operable state to a passive and/or degraded state, a substantially consistent steering behavior is provided and/or achieved and an unintended steering movement of a driver due to a disturbance and/or failure of the feedback actuator 18 does not result in an undesirable vehicle response.

In the present case, a current driving situation and/or an imminent driving situation is taken into account and the steering characteristic is changed as a function of the current driving situation and/or the imminent driving situation. Preferably, a corresponding change in the steering characteristic takes place only when the vehicle 12 is cornering or when imminent cornering is detected. As a result, the operating state corresponds to cornering, whereby the steering characteristic is only changed when the wheel steering angle of the vehicle wheels 22, 24 is not equal to zero.

Furthermore, a dynamic and/or an absolute value of the driver target specification for the wheel steering angle control element 20, e.g. a maximum deflection of the steering handle 16 and/or a steering speed of the steering handle 16, is considered when changing the steering characteristic and in particular when modifying the steering ratio. The dynamic and/or the absolute value of the driver target specification can, e.g., be ascertained using a corresponding vehicle sensor and/or using a further monitoring function (not shown) of the computing unit 34. In this context, the steering characteristic can, e.g., be changed by modifying the steering ratio if the dynamic and/or absolute value of the driver target specification exceeds a limit value, whereby an over-reaction of the driver can be ascertained when the active feedback torque of the feedback actuator 18 is removed and the steering characteristic can be adjusted as a function thereof.

Figure 2:
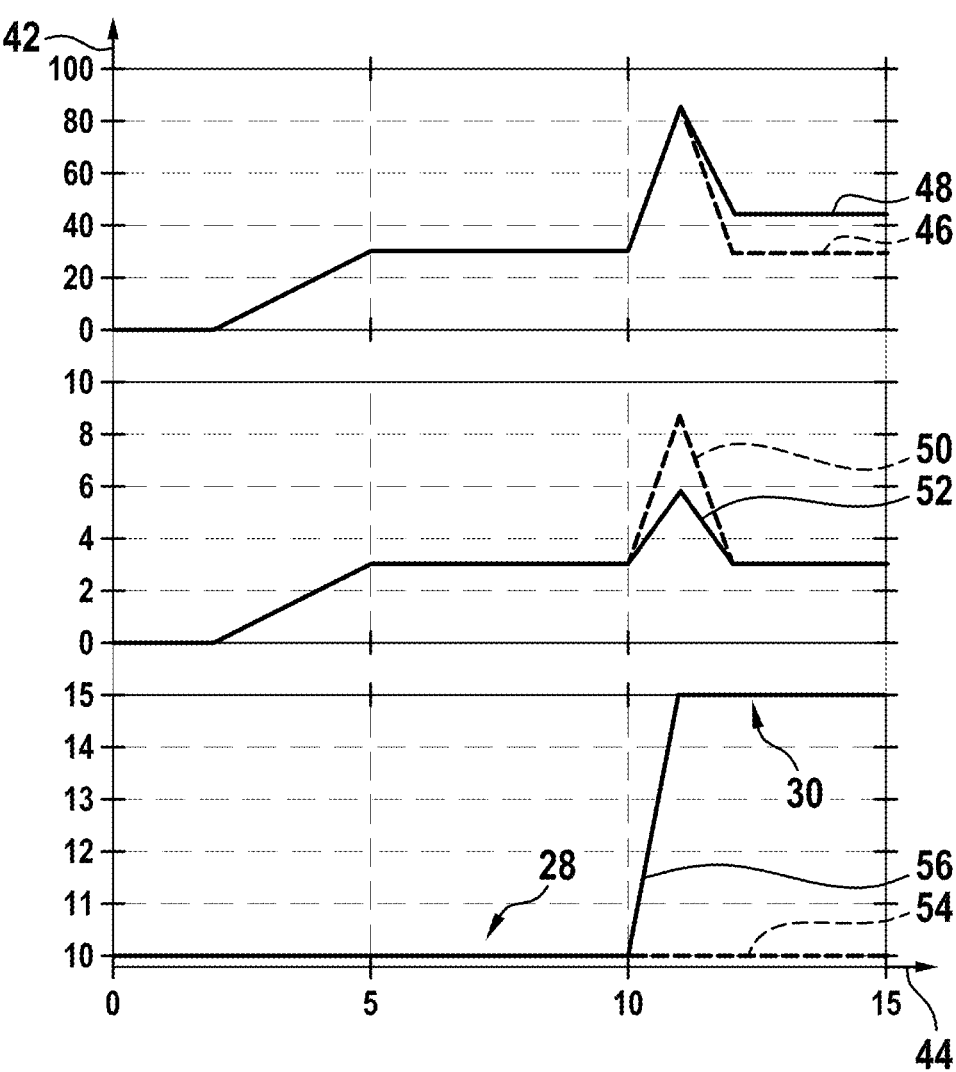

In addition, the steering ratio is increased in the operating state, in particular from a normal or current steering ratio 28 used, in particular in the normal operating state, to a modified steering ratio 30 (see in particular also FIG. 2). The normal or current steering ratio 28 has a fixed value. The same applies to the modified steering ratio 30. In addition, the normal or current steering ratio 28 and the modified steering ratio 30 in the present case are selected as a function of the vehicle speed. In principle, however, constant values for a normal or current steering ratio and/or a modified steering ratio are also possible. Increasing the steering ratio is particularly useful if it is ascertained on the basis of the current driving situation and/or the imminent driving situation and/or the dynamics and/or absolute value of the driver target specification that the driver is steering further into the bend than intended. Increasing the steering ratio in this case reduces the vehicle response and the situation becomes more manageable for the driver. In principle, controllability is increased by increasing the steering ratio, as the removal of driver steering precision due to the lack of feedback torque can be at least partially compensated for by a reduction in vehicle response. If the steering ratio is, e.g., increased from a value of 10 to a value of 15, then a deflection of the steering handle 16 to 85° only results in a wheel steering angle of 5.67°, in which case the driver need only correct or steer back by 40° on the steering handle 16 in order to set the required 3° wheel steering angle for exemplary cornering.

A change from the normal or current steering ratio 28 to the modified steering ratio 30 further is performed by means of a cross-fade and using a moving average. For this purpose, a fade factor is defined which initially has a value of 0, and it has a value of 1 at the end of the cross-fading or the fade phase. An initial steering ration or actual steering ratio is then obtained during the cross-fade or fade phase by superimposing the normal or current steering ratio 28 and the modified steering ratio 30 and taking the fade factor into account. In this context, the following applies to the initial steering ratio or actual steering ratio:

$$i.\ VSR = VSR_{norm} \cdot (1 - KP) + VSR_{mod} \cdot KP$$

where VSR describes the initial steering ratio or actual steering ratio, $VSR_{norm}$ describes the normal or current steering ratio 28, and $VSR_{mod}$ describes the modified steering ratio 30, while KP describes the fade factor.

The fade factor is also a dynamic value that can be influenced by a steering speed of steering handle 16, thereby determining a duration of the cross-fade. As a result, when changing the steering characteristics, and in particular modifying the steering ratio, a steering speed of the steering handle 16 is considered and a duration of the cross-fade varies as a function of the steering speed, as a result of which, depending on the steering dynamics, it is advantageously possible to cross-fade more or less quickly from the normal or current steering ratio 28 to the modified steering ratio 30.

An integrator 32 is also used for cross-fading. The integrator 32 is 0 and/or deactivated in the normal operating state and is only activated in the operating state by an error signal provided by the monitoring function 26. Consequently, the integrator 32 is only activated if a disturbance and/or a failure of the feedback actuator 18 is ascertained using the monitoring function 26. Moreover, the integrator 32 must still be enabled by an enable signal in the present case, in particular after activation by the error signal. Preferably, the enable signal is only generated when the normal or current steering ratio 28 is less than the modified steering ratio 30 and a sign of a deflection of the steering handle 16 and a sign of the steering speed of the steering handle 16 coincide with each other. In this context, the integrator 32 is thus released only under the condition that the normal or current steering ratio 28 is less than the modified steering ratio 30 and under the condition that the driver actually increases their driver target specification or steering specification and therefore steers further into the bend when cornering. In principle, however, activation and/or release of the integrator could also be omitted.

The actual input magnitude of the integrator 32 is a modified absolute value of the steering speed. The steering speed is in this case modified via a dead zone, so a reaction only occurs when the driver initiates clear steering movements or the steering speed reaches a corresponding threshold value. Scaling can also be used to select the duration of the cross-fade or the dynamic of the cross-fade accordingly.

FIG. 2 shows exemplary diagrams of various signals for operating the steering system 10.

An ordinate axis 42 is in the form of a value axis. A time is shown in [s] on an abscissa axis 44. Curve 46 shows a hypothetical course of a deflection of the steering handle 16, in particular in the form of an actual steering wheel angle without changing the steering characteristics by modifying the steering ratio. Curve 48 shows a course of a deflection of the steering handle 16, in particular in the form of an actual steering wheel angle with a change in the steering characteristics by modifying the steering ratio. Curve 50 shows a hypothetical course of a driver target specification for the wheel steering angle control element 20 or a wheel steering angle of the vehicle wheels 22, 24 without changing the steering characteristics by modifying the steering ratio. Curve 52 shows a course of a driver target specification for the wheel steering angle control element 20 or a wheel steering angle of the vehicle wheels 22, 24 with a change in the steering characteristics by modifying the steering ratio. Curve 54 shows the normal steering ratio 28 as well as a hypothetical course of the normal steering ratio 28 without changing the steering characteristics by modifying the steering ratio. Curve 56 shows the modified steering ratio 30.

FIG. 2 shows that the driver first turns into a bend and then travels at a constant radius until the feedback actuator 18 fails at second 10. Curves 50 and 52 clearly show the reduced wheel steering angle of the vehicle wheels 22, 24 achieved by the method according to the disclosure and the associated lower vehicle response. Curves 46 and 48 also show that, after a response time, a correction angle needed to travel the same radius as before the feedback actuator 18 failed may be smaller.

Figure 3:
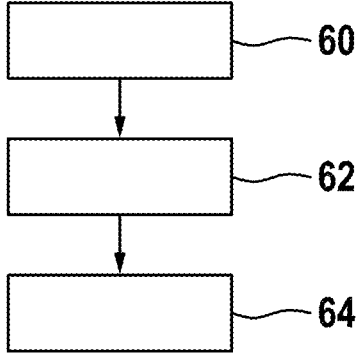

Finally, FIG. 3 shows an exemplary flow chart with the main method steps of the process for operating the steering system 10.

Method step 60 corresponds to a normal operating state, in particular an error-free state. In this case, the steering ratio corresponds to a normal steering ratio 28 and can, e.g., have a value of 10. In addition, operation of the feedback actuator 18 is monitored using the monitoring function 26.

In method step 62, a disturbance and/or failure of the feedback actuator 18 is ascertained using the monitoring function 26.

In subsequent method step 64, a steering characteristic of the steering system 10 is changed by modifying a, in particular virtual, steering ratio between the operating unit 14 and the wheel steering angle control element 20. For this purpose, the steering ratio is advantageously increased and changed from the normal steering ratio 28 to a modified steering ratio 30 which can, e.g., have a value of 15.

The exemplary flow chart in FIG. 3 is only intended to describe an exemplary method for operating the steering system 10. In particular, individual method steps can also vary, or additional method steps can be added. In this context, it is conceivable that, e.g., a current driving situation and/or an imminent driving situation and/or a dynamic and/or an absolute value of a driver target specification for the wheel steering angle control element 20 be considered. It is also possible to change from the normal steering ratio 28 to the modified steering ratio 30 by means of a cross-fade.

The invention claimed is:

1. A method for operating a steering system of a vehicle, in which the steering system is designed as a steer-by-wire steering system and comprises (i) an operating unit with at least one steering handle and with at least one feedback actuator that interacts with the steering handle, and (ii) at least one wheel steering angle control element, which is operatively connected to the operating unit, for changing the steering angle of at least one vehicle wheel, the method comprising:

monitoring an operation of the at least one feedback actuator using a monitoring function; and in at least one operating state in which a disturbance and/or a failure of the feedback actuator is ascertained via the monitoring function, modifying a steering ratio between the operating unit and the at least one wheel steering angle control element so as to change a steering characteristic of the steering system.

2. The method according to claim 1, wherein the changing of the steering characteristic includes considering a current driving situation and/or an imminent driving situation.

3. The method according to claim 1, wherein the at least one operating state corresponds to cornering, and the modifying of the steering characteristic includes modifying the steering characteristic only if the wheel steering angle of the vehicle wheel is not equal to zero.

4. The method according to claim 1, wherein the changing of the steering characteristic includes considering a dynamic and/or an absolute value of a driver target specification for the wheel steering angle control element.

5. The method according to claim 1, wherein the modifying of the steering ratio includes increasing the steering ratio in the at least one operating state.

6. The method according to claim 1, wherein the modifying of the steering ratio includes, in the operating state, changing a normal or current steering ratio to a modified steering ratio via a cross-fade.

7. The method according to claim 6, wherein the modified steering ratio has a fixed value.

8. The method according to claim 6, wherein the modifying of the steering characteristic includes considering a steering speed of the steering handle and varying a duration of the cross-fade as a function of the steering speed.

9. The method according to claim 6, wherein the changing of the normal or current steering ratio to the modified steering ratio via the cross-fade includes using an integrator for the cross-fade, the integrator being activated in the at least one operating state by an error signal provided by the monitoring function and/or being enabled by an enable signal.

10. The method according to claim 9, wherein the enable signal is only generated when (i) the normal or current steering ratio is less than the modified steering ratio and/or (ii) a sign of a deflection of the steering handle and a sign of the steering speed coincide with each other.

11. The method according to claim 9, wherein:

a modified absolute value of the steering speed is used as the input variable of the integrator, and a dead zone is used to modify the steering speed.

12. A computing unit comprising:

at least one operating memory; and at least one processor configured to execute program instructions stored in the at least one operating memory to perform the method according to claim 1.

13. A steering system comprising:

an operating unit which comprises at least one steering handle and at least one feedback actuator that interacts with the steering handle;

at least one wheel steering angle control element operatively connected to the operating unit and configured to control a steering angle of at least one vehicle wheel; and the computing unit according to claim 12.

14. A vehicle comprising:

the steering system according to claim 13.

15. The method according to claim 6, wherein the changing of the normal or current steering ratio to the modified steering ratio via the cross-fade includes a moving average.

16. The steering system according to claim 13, wherein the steering system is a steer-by-wire steering system.

17. The vehicle according to claim 14, wherein the vehicle is a motor vehicle.

\* \* \* \* \*